(12) United States Patent
Watkins (10) Patent No.: US 7,650,625 B2
(45) Date of Patent: Jan. 19, 2010

(54) SYSTEM AND METHOD FOR CONTROLLING AUDIO AND VIDEO CONTENT VIA AN ADVANCED SETTOP BOX

(75) Inventor: Daniel R. Watkins, Saratoga, CA (US)

(73) Assignee: LSI Corporation, Milpitas, CA (US)

( * ) Notice: Subject to any disclaimer, the term of this patent is extended or adjusted under 35 U.S.C. 154(b) by 1830 days.

(21) Appl. No.: 10/320,046

(22) Filed: Dec. 16, 2002

(65) Prior Publication Data

US 2004/0117825 A1    Jun. 17, 2004

(51) Int. Cl.
  *H04N 7/18* (2006.01)
  *H04N 7/173* (2006.01)
  *H04N 7/16* (2006.01)

(52) U.S. Cl. .................... 725/139; 725/68; 725/100; 725/110; 725/131; 725/151

(58) Field of Classification Search ............. 725/38–61, 725/68, 100, 110, 131, 139, 151; 715/203
  See application file for complete search history.

(56) References Cited

U.S. PATENT DOCUMENTS 5,557,683 A * 9/1996 Eubanks .................. 381/86
5,619,250 A * 4/1997 McClellan et al. .......... 725/132
5,974,380 A * 10/1999 Smyth et al. .............. 704/229
5,999,689 A * 12/1999 Iggulden .................. 386/46
6,493,872 B1 * 12/2002 Rangan et al. ............. 725/32

* cited by examiner

*Primary Examiner*—Christopher Kelley
*Assistant Examiner*—Alazar Tilahun
(74) *Attorney, Agent, or Firm*—Christopher P. Maiorana, PC (57) ABSTRACT

A settop box system for capturing and controlling live and recorded audio and video content. The system records digital and analog data from video and audio content, such as in a home entertainment center. The system records data from the content as specified and the data may be sequenced into clips that can be searched and indexed. A user may create comparison programs that allow searches of either pre-recorded or incoming content to be performed. In addition, the program allows editing of recorded programs, such as filtering of audio content or overlaying a video program with a different audio background. Multiple audio and video feeds may be handled simultaneously and the program's functions may be executed without viewing of the content being manipulated. The recorded content may also be indexed and even clips of the content may be indexed.

41 Claims, 4 Drawing Sheets

SYSTEM AND METHOD FOR CONTROLLING AUDIO AND VIDEO CONTENT VIA AN ADVANCED SETTOP BOX

FIELD OF THE INVENTION

This invention relates generally to a system and method for providing a multitude of audio and video control features, and, more particularly, to an advanced settop box system including hardware and software that provides a user with the ability to perform advanced control functions on audio and video programs, either singularly or simultaneously, such functions including record, edit, compare, overlay, program, create, play, etc.

BACKGROUND OF THE INVENTION

In many audio-video systems today, a "settop box" is used to receive communicated services and to interface with the user. Originally, the primary role for settop boxes' was to allow conditional access to the communicated services. Conditional access (CA) refers generally to a technology used to control access to communicated services such as television programming. Several different CA schemes currently exist. The transmissions conveying such communicated services are typically scrambled or encrypted, and only authorized users are provided with means to descramble or decrypt the transmissions. Scrambling typically involves modifying a transmission signal by, for example, removing synchronization pulses. Encryption typically involves modifying digital data conveyed by the transmission signal according to a particular cryptographic algorithm. Conditional access has been used for many years to provide exclusive access to premium television channels and special broadcasts (e.g., sporting events and pay-per-view movies). Conditional access can also be used to provide exclusive access to digital radio broadcasts, digital data broadcasts, and interactive services. Known CA technologies for scrambling or encrypting television transmissions include VideoCrypt™ (Thomson Consumer Electronics, S A FR), VideoCipher™ and DigiCipher™ (NextLevel Systems, Inc., Chicago, Ill.).

A typical CA system used to scramble or encrypt television programming generally includes CA encoding equipment integrated into broadcast equipment (e.g., cable, satellite, or terrestrial broadcast equipment) at a service provider's location. In general, the CA encoding equipment modifies (i.e., scrambles or encrypts) information conveyed by a transmission signal produced by the broadcast equipment. Where the CA encoding equipment employs encryption, the CA encoding equipment encrypts digital data (e.g., digitized video and audio information), and the broadcast equipment transmits a signal conveying the encrypted digital data to the subscribers. The CA encoding equipment may also insert messages into the transmission signal that provide information necessary for decryption of the encrypted digital data.

The typical CA system also includes CA decoding equipment at each subscriber's location. The CA decoding equipment typically includes a box receiving the transmission signal capable of being coupled to a television set or other display means. Such boxes are commonly referred to as "settop boxes" or integrated receiver decoders (IRDs). A typical settop box decrypts the encrypted digital data in the transmission signal, converts the digital data to analog signals (e.g., analog video and audio signals), and provides the analog signals for display on a television set or other display means.

Whether or not a settop box includes this capability, current settop boxes are continually advancing to provide further relatively sophisticated functionality to the audio-video systems in which they are coupled. For example, the settop box may provide menus via the display or television to allow the user to control and interact with the system via a user-friendly, graphical user interface (GUI). Additionally, the settop box may provide personal video recording (PVR) capabilities in which communicated services may be recorded and played back at a later, more convenient, time.

To provide these enhanced control and interfacing services via a settop box, the settop box must generally incorporate increasingly sophisticated hardware and software. Accordingly, existing hardware and software capabilities of settop boxes can be further enhanced to provide even more advanced functionality, and to increase the users' control and enjoyment of the system to which the settop box is coupled.

SUMMARY OF THE INVENTION

In accordance with the present invention, a system and method for utilizing a settop box is provided that offers advanced programming and control capabilities, typically to users of home entertainment systems. In one embodiment, the settop box incorporates a digital audio processor and digital video processor that may record and sequence clips of audio and video data. A selected clip may then be used to search for similar content among other recorded data or incoming/live data. In an embodiment, a user selects a recorded clip and trains the system to compare the data in the recorded clip to data in incoming, live content. The system may be further trained by the user so that an action or system control function, such as recording of the incoming content, is initiated if a match is made. The user interfaces with the settop box in order to utilize the system of the present invention to manipulate programs that will be played on output devices, such as televisions and/or stereos in an entertainment system.

In one embodiment, a settop box for controlling an audio-video system comprises a CPU, a digital video processor coupled to said CPU for processing video data and capable of comparing current video data to expected video data, and a digital audio processor coupled to said CPU for processing audio data, wherein one or more control functions may be initiated if current video data sufficiently matches expected video data. The digital audio processor may also be capable of comparing current audio data to expected audio data. The settop box may further comprise a recording module having storage media for storing recorded audio or video data, and a menu module for providing a menu driven interface to the settop box.

In another embodiment, an audio-video system comprises a settop box capable of receiving audio-video data from a live feed, a digital video processor coupled to said settop box for processing video data, and a digital audio processor coupled to said settop box for processing audio data and capable of comparing current audio data to expected audio data, wherein one or more control functions may be initiated if current audio data matches expected audio data. The system may further comprise at least one audio speaker coupled to said settop box and a video display coupled to said settop box. The digital video processor may also be capable of comparing current video data to expected video data. The system may further comprise a recording module having storage media for storing recorded audio or video data, and a menu module for providing a menu driven interface to the settop box.

In one embodiment, the digital video processor comprises a current clip buffer module for storing data from a first video clip, an expected clip buffer module for storing data from a second video clip, and a compare module coupled to the current and expected clip buffer modules, wherein the compare module makes a comparison between the first and second video clips in order to determine if there is a sufficient match. The digital video processor may also comprise a status register which indicates whether a sufficient match has been determined between the current video clip and the expected video clip. The digital video processor may further comprise a control register specifying parameters of the comparison between the first and second video clip.

In one embodiment, the digital audio processor comprises a current audio clip buffer module for storing data from a first audio clip, an expected audio clip buffer module for storing data from a second audio clip, and an audio compare module coupled to the current and expected audio clip buffer modules, wherein the audio compare module makes a comparison between the first and second audio clips in order to determine if there is a sufficient match. The digital audio processor may also comprise an audio status register which indicates whether a sufficient match has been determined between the current audio clip and the expected audio clip. The digital audio processor may further comprise an audio control register specifying parameters of the comparison between the first and second audio clip.

In another embodiment, a method of controlling audio or video programming via a settop box comprises comparing a current audio or video clip to an expected audio or video clip wherein one or more control functions is initiated if said current audio or video clip sufficiently matches said expected audio or video clip. The one or more control functions may include any system control functions or features such as: audio or video recording, control of audio or video playback, channel changing, audio mixing, audio filtering, audio or video overlay, audio attenuation, audio or video pace control, and audio or video indexing.

DETAILED DESCRIPTION OF EMBODIMENTS

In this disclosure, numerous specific details are set forth to provide a sufficient understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, some details have been omitted inasmuch as such details are not considered necessary to obtain a complete understanding of the present invention, and are considered to be within the understanding of persons of ordinary skill in the relevant art. It is further noted that all functions described herein may be performed in either hardware or software, or a combination thereof, unless indicated otherwise-Certain terms are used throughout the following description and claims to refer to particular system components. As one skilled in the art will appreciate, components may be referred to by different names. This document does not intend to distinguish between components that differ in name, but not function. In the following discussion and in the claims, the terms "including" and "comprising" are used in an open-ended fashion, and thus should be interpreted to mean "including, but not limited to.". Also, the term "couple" or "couples" is intended to mean either an indirect or direct electrical or communicative connection. Thus, if a first device couples to a second device, that connection may be through a direct connection, or through an indirect connection via other devices and connections.

Figure 1:
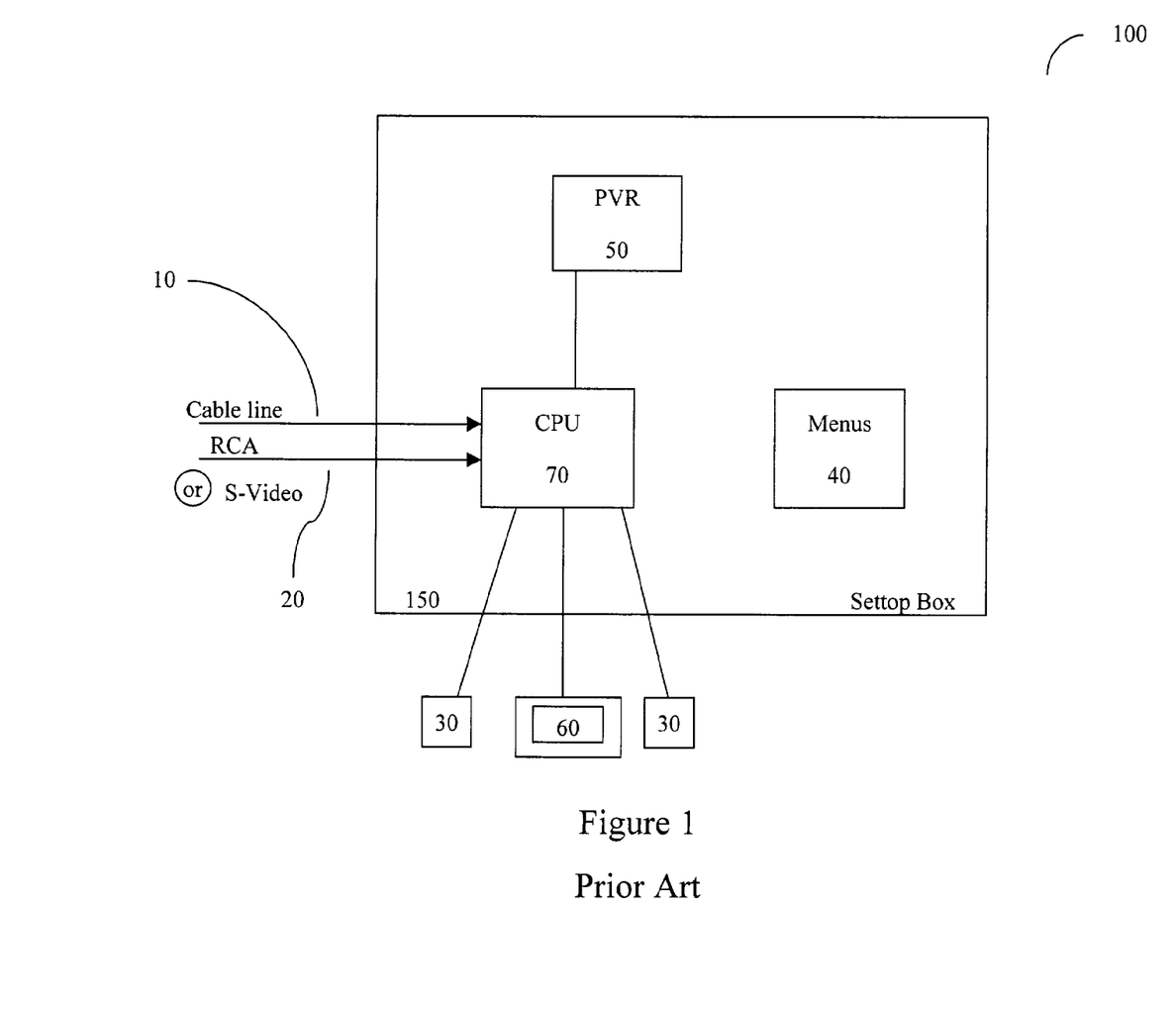
FIG. 1 is a block diagram illustrating a prior art application of a settop box.

FIG. 1 is an example of a prior art settop box system 100 for controlling audio and video programs. A cable line 10 provides live audio and video programming to the settop box 150. A second line 20 provides live RCA or S-video audio and video programming to the settop box 150. Other possible sources of audio and video programming would include wireless feeds (satellite), stereo systems, etc. The settop box 150 may include a processor or central processing unit (CPU) 70 coupled to a recording module 50, such as a PVR, and a menu module 40. The processor 70 is also coupled to the audio and video sources 10, 20, and the audio and video speakers 30 and display equipment 60. A user may view and listen to the programming content 10, 20 via the speakers 30 and display 60. Typical tools or features available to a user in such a prior art system include the ability to use picture-in-picture (PiP), and limited audio and video playback options. Program guides or menus may also be available via the menu module 40 that provide structured information to a user on what programs are playing at what times on what channels. Examples of other possible features include the PVR function, which typically allows a user to simultaneously pause and record a live program, and then resume play of the program from the pause point while continuing to record the live program in real time.

Figure 2:
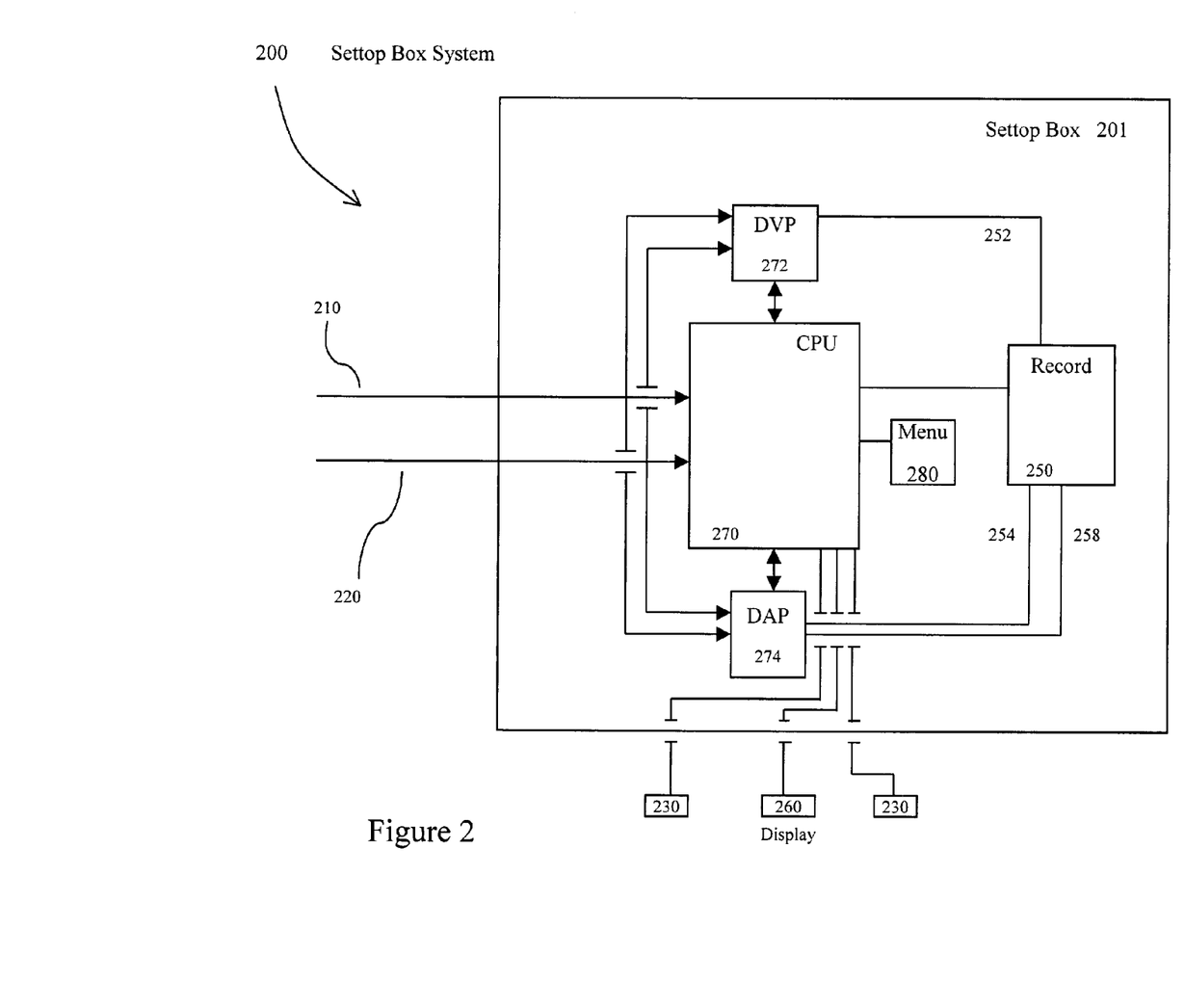
FIG. 2 is a block diagram illustrating an embodiment of a settop box in accordance with the present invention.

FIG. 2 illustrates an embodiment of a settop box system 200 for enhanced user control of an audio-video system in accordance with the present invention. Audio and video content are played for a user via a display 260 and speakers 230. The system 200 is capable of handling at least four sources of audio and video programming, which include two live programming feeds and two recorded programming feeds. In this embodiment, the system 200 can handle live television program data with its associated audio data 210, live radio data 220, recorded video data 252 with its associated audio data 254, and a recorded audio program 258, such as recorded music. It is also contemplated, however, that other embodiments could handle more or less live or recorded audio-video feeds. The programming content received over the feeds may include either digital or analog data, as the system 200 can convert any analog data to digital form as necessary to execute user commands or other system control functions. In this embodiment of the present invention, the system 200 is capable of simultaneously handling all of the audio and video feeds in combination, which allows a user a multitude of recording, editing, and playback options. The audio and video portions of the same program are processed separately by the system, giving further flexibility to a user. In this embodiment, it is contemplated that the content may be a video program or an audio program from a live cable line 210, live RCA/S-video line 220, or from a recording module 250.

As shown in FIG. 2, the cable line 210, RCA/S-video line 220, display 260, and speakers 230 are each coupled to a settop box 201. The settop box 201 houses a central processing unit ("CPU") 270, digital video processor ("DVP") 272, digital audio processor ("DAP") 274, recording module 250, and a menu module 280. The recording module 250, the menu module 280, live content feeds 210, 220, speakers 230, display 260, DVP 272, and DAP 274 are all coupled to the CPU 270.

A user typically interacts with the settop box system 200 via menus or values (e.g., channel numbers, volume status bars, etc.) visible on the display 260. The display 260 is typically a television screen, but could include a computer monitor or other device that allows a user to view content and/or menus. The display 260 is often not only the place where menus or equipment status values are exhibited, but is also where video content is shown for the user to see. On the other hand, it is possible that the settop box system 200 includes a screen separate from the display 260 through which a user may interact with the system. In this embodiment of the system 200, the display is coupled to the CPU 270, but could also be directly coupled to the DVP 272, and to the video content feeds entering the system either live 210, 220, or via the recording module 250.

Similarly, the speakers 230 are coupled to the CPU 270, but could also be directly coupled to the DAP 274, the display 260, and the audio content feeds in the system, either the live feeds via cable line 210 or RCA/S-Video line 220, or recorded feeds from the recording module 250. The speakers 230 project the audio to a user or users. The audio may be any music or sound associated with a song, a television show or movie, a video game, etc. In addition, the audio source may be live or recorded. Where the audio corresponds to video content that is simultaneously exhibited on the display 260, the CPU 270 controls the DAP 274 and the DVP 272 to ensure the audio and video are properly coordinated.

The cable line 210 and RCA/S-video line 220 provide real-time live content including audio and video to the settop box system 200. The content may be analog or digital. In this embodiment, it is contemplated that the cable line 210 will provide digital content while the RCA/S-video line 220 provides analog content. Regardless however, the content is processed by the CPU 270 as necessary and is then provided to the recording module 250, the display 260, the speakers 230, the DVP 272, and the DAP 274. The cable line 210 content could be displayed live to a user on the display 260 and speakers 230, could be saved for later playback in the recording module 250, or could be further processed via the DVP 272 or DAP 274.

The recording module 250 is coupled to at least the CPU 270. The recording module 250 is where the software and menus for the settop box system of the present invention are stored and accessed by the CPU 270. In addition, programs created by users, and audio and video content, are stored in the recording module 250 for future playback. The recording module 250 may use any suitable computer-readable media as memory for the storage of the recorded information.

This embodiment of the settop box system 200 also includes a menu module 280. The menu module is coupled to the CPU 270, and could also be directly coupled to the recording module 250 and the display 260. The menu module 280 may provide GUI-type menus on the display that allow a user a means of interfacing with the settop box system 200. Manipulation of the menus typically occurs via a remote control unit. The menus are exhibited on a display 260, which may be a television screen or computer monitor. Menus and system status values, such as channel number, volume, etc., from the menu module typically lead a user through every detail of manipulation of the settop box system 200, from displaying guides of scheduled programming, to changing channels and recording, to editing and creating content.

Among the CPU's 270 functions is its ability to convert analog content to digital information. When so directed, the CPU 270 interfaces with the live content feeds 210, 220 and the recording module 250 to record audio and video programs in the recording module 250. The processing capability is such that a recording of one audio or video program may occur while a second is exhibited to a user. In addition, the CPU 270 and menu module 280 provide a user with GUI-type menus on a display 260 for interfacing with the settop box system 200. When a user manipulates the menus, the CPU 270, typically via program software, executes the user's commands and saves any desired programs and edited content to the recording module 250.

As shown in FIG. 2, the DVP 272 is coupled to the CPU 270, the DAP 274, and the recording module 250. The DVP 272 generally handles advanced video processing and control features for the system 200. The DVP will be discussed more fully below in reference to FIG. 3.

Also as shown in FIG. 2, the DAP 274 is coupled to the CPU 270, the DVP 272, and the recording module 250. The DAP 274 generally handles advanced audio processing and control features for the system 200. The DAP will be discussed more fully below in reference to FIG. 4.

Figure 3:
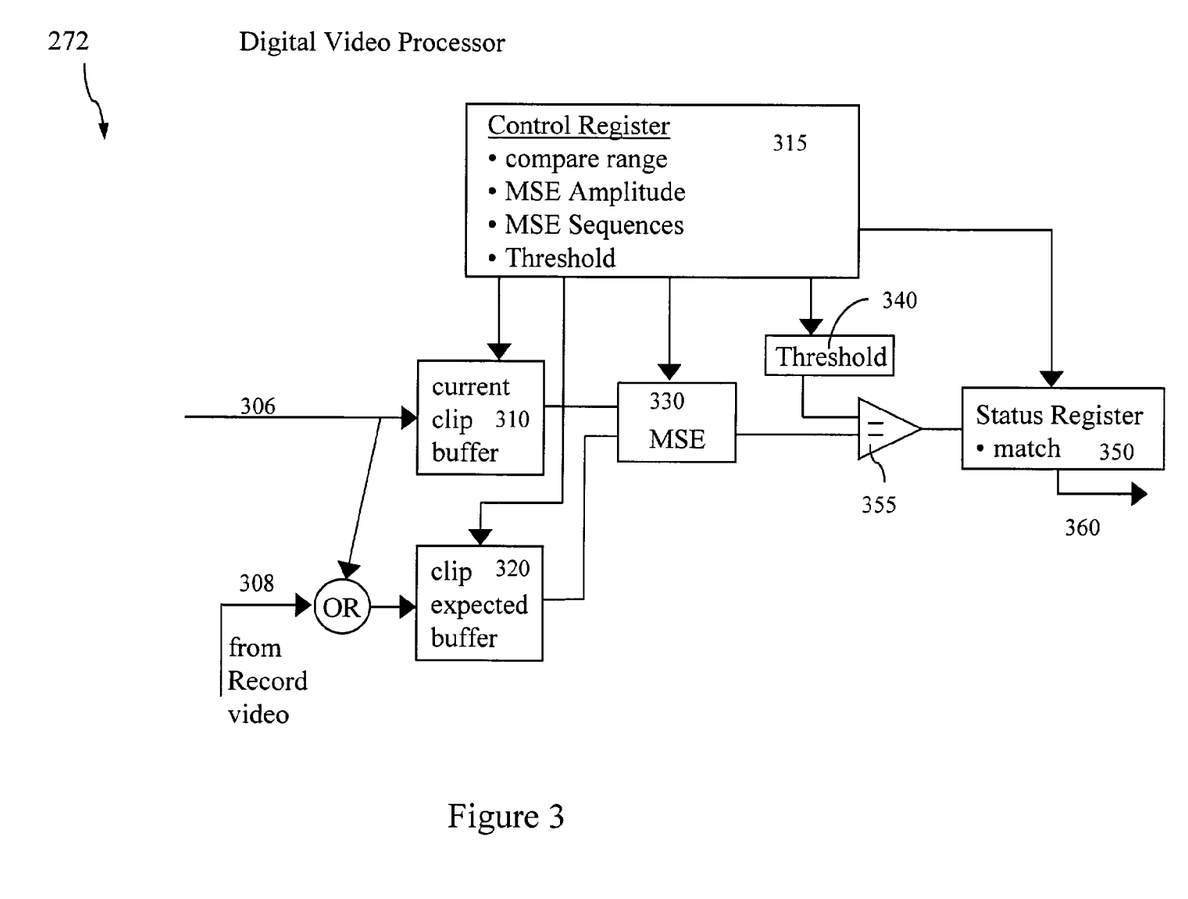
FIG. 3 is a block diagram illustrating an embodiment of a digital video processor in accordance with the present invention.

FIG. 3 illustrates an embodiment of the DVP 272 in accordance with the present invention. In this embodiment, the DVP 272 receives data from at least one live video program feed 306 and at least one recorded video program feed 308. The data from the live video program feed 306 enters the current clip buffer module 310 and either this live data or the data from the recorded video program feed 308 enters the expected clip buffer module 320. Typically, data entering the current clip buffer 310 is data that has not been previously recorded, while data entering the expected clip buffer 320 has been previously recorded. The current clip buffer module 310 and expected clip buffer module 320 are coupled to the mean square error (MSE) module 330. The MSE module 330 is coupled to the compare module 355. The Threshold module 340 is also coupled to the compare module 355. The compare module 355 is coupled to the status register module 350. Depending on the results received from the compare module 355, the status register module 350 may or may not provide information initiating control functions elsewhere in the system 200. A control register 315 can be used to control variables, parameters, or characteristics of the MSE module 330, threshold module 340, clip buffers 310 and 320, and status register 350. These parameters could include the compare range or size of the clips, MSE amplitude or sequences, and the threshold value to determine a sufficient match between the clips.

Ion the embodiment of the DVP 272 illustrated in FIG. 3, data from the live feed 306 enters the current clip buffer module 310. Similarly, data from the recorded feed 308 is temporarily stored in the expected clip buffer module 320. The data in the expected clip buffer module 320 is a clip or portion of a full video program wherein the clip is typically selected by a user. The portion of the live feed 306 retained by the current clip buffer module 310 is of similar length to the selected clip in the recorded clip buffer module 320. These functions are controlled via the control register 315. The selected data from the expected clip buffer module 320 and the similarly sized portion of a live feed 306 retained in the current clip buffer module 310 are delivered to the MSE module 330 where the mean square error of the signals is determined. In the compare module 355 the MSE value determined in the MSE module 330 is then compared to an acceptable MSE value, or range of MSE values, established by the threshold module 340. If the determined MSE value is within an acceptable range, then the acceptable determination in the compare module 355 is expressed in the status register module 350. A system 200 function, which depends on the existence of a match in the compare module 355, may be initiated via a signal 360 when such a match is expressed in the status register 350. If the MSE value is outside the acceptable range, the existence of a match is not expressed in the status register 350, and the signal 360 indicates to any pending system functions that the clips are not a match.

In one application of the DVP, via the control register 315, a pre-recorded clip is selected, such as the introduction to a favorite television program. Data from the live feed 306 enters the settop box system 200 and the current clip buffer module 310. Data from a recorded feed 308, in the form of the selected clip of the favorite television program introduction, is retained in the expected clip buffer module 320. Clips of data of relatively equal size to the selected clip in the expected clip module 320 are retained in the current clip buffer 310. The monitoring of the live feed 306 takes place as each clip of the live feed 306 is compared to the clip in the expected clip buffer module 320. The comparison function takes place as the clips from the buffer modules 310, 320 enter the MSE module 330, and the determined MSE and the range of acceptable MSEs from the threshold module 340 enter the compare module 355, where they are compared. The continuous monitoring persists unless/until a match is made in the compare module 355, which is when the determined MSE falls within the acceptable range of MSEs set by the threshold module 340. When the determined MSE falls within the acceptable range, the existence of the sufficient match is expressed in the status register 350. A signal 360 expressed by the status register 350 and monitored by the pending system command then initiates execution of the command. In this application of an embodiment of the settop box system 200 and DVP 272, if the selected clip of the favorite television program's introduction matches a clip from the live television feed 306, the signal 360 is expressed by the status register 350 and initiates execution of recording of the live program so the user may replay the program at a later time. In this fashion, a video clip can be used to initiate any system command such as change channel, record, etc. Thus, for example, the DVP 272 would allow a user to search for a specific, known video clip in order to view, record, or perform some other function on the television program.

Figure 4:
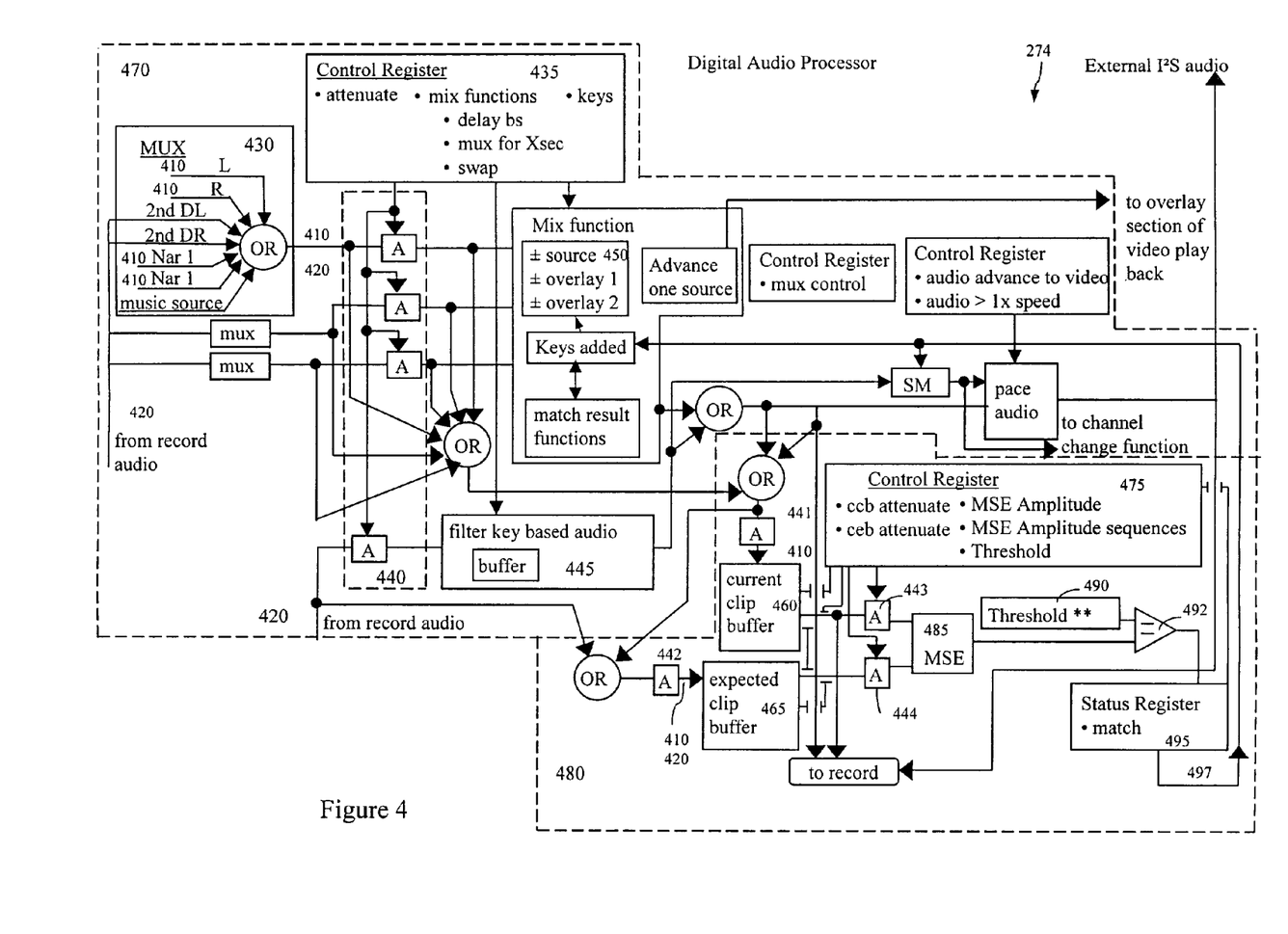
FIG. 4 is a block diagram illustrating an embodiment of a digital audio processor in accordance with the present invention.

FIG. 4 illustrates an embodiment of the DAP 274 in accordance with the present invention. In this embodiment, the DAP 274 is functionally divided into two sections: the match section 480 and the mix section 470. These sections are not really separate but are integrated together in this embodiment of the DAP 274. The DAP 274 receives data from one or more live audio program feeds 410 and one or more recorded audio program feeds 420. The data from a live program feed 410 first enters the mix section 470 of the DAP 274, while the data from a recorded program feed 420 may first enter either the mix section 470 or the match section 480. The mix section 470 comprises a multi-plexer 430, a control register 435, attenuation module 440, overlay module 450, and a filtering module 445. Each of the multi-plexer 430, control register 435, attenuation module 440, overlay module 450, and filtering module 445 may be coupled to the other as shown. In addition, each of the multi-plexer 430, control register 435, attenuation module 440, overlay module 450, and filtering module 445 may be coupled to the match section 480 as shown. Generally, the components of the mix section 470 receive commands initiated via the control register 435, or commands from the match section 480 such as when a sufficient match has occurred between an expected audio clip and a current audio clip.

Multiple live and/or recorded audio feeds may enter the multi-plexer 430 of the mix section 470. The multi-plexer 430 is set so that its audio output is any one of the audio feeds, or some blend of two or more of the feeds. The multi-plexer output provides audio data to the attenuation module 440, filter module 445, overlay module 450, match section 480, or may directly output the data for user enjoyment. Typical mixing options may be provided. Mix timing options include straight mix, delay source for mix, multiplexing for a given time between the two, swap, and pace swap. In addition, timing can be added such that other audio play options are mixed/selected at a given programmed time interval. Yet other mix options include the ability to program different fragments of the same audio program to emit from different speakers, for audio from two different programs to emit simultaneously from different speakers, or to change which fragment of audio or which program's audio emits from which speaker in mid-play. Another application would be for a user to create an automatic command where the multi-plexer 430 receives a signal from the match section 480 when the current program goes to commercial. Upon going to commercial, data from the mix section 480 could key the multi-plexer to output music to a user until the commercial is complete.

The mix control register 435 generally controls the various functions of the mix section 470. Via the mix control register 435, a user can manipulate audio data by controlling at least the multi-plexer 430, attenuation module 440, overlay module 450, and filter module 445. The attenuation module 440 is controlled by the mix control register 435 and receives audio data either directly from live or record feeds 410, 420, or from one of the other modules such as the multiplexer 430, overlay 450, or attenuation 440 modules. The amplitude of audio data is manipulated by the attenuation module 440 before the data is transmitted to the match section 480, overlay module 450, filter module 445, or output for user enjoyment. Similarly, the overlay module 450 and filter module 445 are controlled by the control register 435. The overlay module 450 overlays one set of audio data with another. The filter module 445 may apply various filters to the data from an audio transmission.

In this embodiment, the functioning of the match section 480 of the DAP 274 is similar to that of the DVP 272 illustrated in FIG. 3. Live audio directly from a live feed 410 or from a module in the mix section 470 enters the current audio clip buffer module 460. Similarly, data from a live feed 410 or a recorded feed 420, which may or may not be manipulated in the mix section 470, is temporarily stored in the expected audio clip buffer module 465. Attenuators 441, 442 are place in the lines coming into the audio clip buffers 460, 465 to control the amplitude of the incoming audio content. The data in the expected audio clip buffer module 465 is a clip or portion of a full audio program wherein the clip is selected/recorded by a user. The portion of live audio retained by the current audio clip buffer module 460 is of similar size to the user selected clip in the expected audio clip buffer module 465. The data from the expected audio clip buffer module 465 and the similarly sized portion of live audio data retained in the current audio clip buffer module 460 are delivered to the audio MSE module 485, first going through the attenuators 443, 444. In the audio MSE module 485, the mean square error or difference of the signals is determined and is represented by an MSE value. The MSE value determined in the audio MSE module 485 and a threshold audio MSE value from the threshold audio MSE module 490 are then compared in the audio compare module 492. If the determined MSE value is within the acceptable range of MSE values conveyed by the audio MSE threshold module 490, as determined by the audio compare module 492, then the existence of a sufficient match is expressed in the audio status register module 495. Depending on the results of the comparison, a signal 497 may be initiated to control other system commands or functions. An audio control register 475 can be used to control the audio MSE module 485, audio threshold module 490, audio clip buffers 460,465, and audio status register 495.

Referring to FIGS. 2, 3, and 4, the settop box system of the present invention provides enhanced control features. An example of an application of the settop box system 200 and its DVP 272 and DAP 274 would be if a user desired to record a televised sporting event and then overlay a desired audio program over the audio of the sporting event. First, the user may interact with the settop box system 200 via menus available from the menus module 280, where the CPU 270 couples to the record module 250 and the menus module 280 to present the menus on the display 260. The compare and match functions of the DAP 274 and DVP 272 are similar. Where a user desires to perform search and compare actions with an audio clip, he or she may record a clip of the audio that a particular television broadcasting company uses at the introduction to its football programming. An example may be the usual introduction music for Monday Night Football. The data associated with the audio clip would then be stored in the record module 250 for future use.

The following Monday night the user could then direct the settop box system 200 to automatically monitor the same broadcast channel and initiate recording of the desired audio programming when a comparative match is made and expressed by the DAP's 274 audio status register module 495. The match would occur if a segment of data in the audio feed from the current Monday Night Football program matches with the segment of pre-recorded (expected) audio data previously recorded by the user. Referring to FIG. 4, as monitoring occurs, the previously recorded clip of the Monday Night Football audio program is retained in the expected audio clip buffer 465 and the live audio programming from the channel passes to the current audio clip buffer 460. The MSE between clips is calculated in the audio MSE module 485. If the MSE is below that set in the threshold module 490, the compare module 492 and audio status register 495 will recognize and express that the threshold has been met, a sufficient match has been determined, and correspondingly can trigger a record command to initiate recording of the program, or any other system control function.

Either simultaneously or at a later playback time, again upon positive compare between the expected clip and the current program in the compare module 492, the user may also set the positive compare expressed in the audio status register 495 to key the overlay module 450 of the mix section 470 of the DAP 274. The overlay module 450 would then superimpose some pre-selected audio, such as music, or possibly the radio programming of the same event, so that it is associated with the Monday Night Football video program as it is recorded by the record module 250. The CPU 270 couples to the DAP 274 and record module 250 in order to execute these functions on a live feed of a football game. As a result, a recording comprised of the live video program and overlay of audio is created, which can be accessed for future replay.

An additional option would be if the football program is recorded prior to overlaying the alternative audio onto the video of the football program. In that case, the CPU 270 couples to the DAP 274 and record module 250 in order to access the video program from the record module 250, rather than the cable 210 or RCA/S-Video 220 connection, prior to keying the function of the overlay module 450 in order to superimpose a desired audio. Another option would be to use the function of the overlay module 450 to add background audio to the entire video program, or only to sections of the video program depending on whether a pre-set limit established in the audio threshold module 490 is met using the compare function in the audio compare module 492. The system 200 is capable of performing all of its functions in the background while a user is viewing other programs on the display 260, or while the user is not actively using the system 200 at all.

Another example application of the system is use of the filtering option in the mix section 470 of the DAP 274. Referring again to the example of manipulating the Monday Night Football programming, either a live or recorded feed of the audio data associated with the program may enter the filtering module 445. The compare function of the match section 480 of the DAP 274 would use a pre-recorded audio pattern as the expected pattern for the crowd noise. When the limit set in the audio threshold module 490 is met by comparing in the audio compare module 492, the expression of the match in the audio status register module 495 would trigger a key in the mix section 470. The key would signal the filter module 445 to initiate filtering of the crowd noise in either a live or recorded feed of the football game. Similarly, recorded patterns of laughter could be used to filter laughter from a broadcast as it is recorded. The function of the attenuation modules 440, 441, 442, 443, 444 in either the mix section 470 or the match section 480 could be used to modify the amplitude of the live feed, expected (recorded) clip, or current (live or recorded) audio clip, where such modification could enhance the quality of the filtering, mixing, and overlay functions of the mix section 470 of the DAP 274. A further filtering option would be to filter entire segments of audio from a program. In addition, thresholds can be set for filtering so that the filtering is not initiated until the undesirable noise to be filtered reaches a certain level.

Any number of system commands may be initiated using the compare functions of the DVP 272 and DAP 274. The possibilities are multiplied by the settop box system's 200 ability to simultaneously manage four different audio and video signals, both live and recorded. Another example is where a user sets channel change commands such as next channel when browsing or to a specific channel when a desired program is detected by the system. Alternatively, the user may browse by directing the system to change channels automatically when a compare condition has been met within the program the user is enjoying, such as when the enjoyed program goes to commercial. Further, while viewing one program, a user may employ the compare function of the DAP 274 and/or DVP 272 to search other channels for additional desired programming.

In yet another application, a parent may use the compare functions of the DAP 274 and DVP 272 of the settop box system 200 to filter/censor undesired video or audio from programs accessed by their children. An example would be recording segments of recorded movies so that any time a particular movie is later viewed in its entirety, the recorded segment, either audio or video, would be used as the expected clip in the comparison function and filter, overlay, mute, or otherwise render a censored segment of the audio and/or video inaccessible.

The compare function of the settop box system 200 also provides indexing options to users. For example, programs with common audio or video segments may be grouped together. Another example would be to make a comparison of the current program to previously recorded programs, so that if the current program has already been recorded, such as with a re-run of a television sitcom, the compare function would result in a command not to record if it detected within the existing recorded database that the current broadcast was already recorded by the user.

The audio channel features in summary form include: accessing any one of four audio sources, source use, mix timing, volume choices, pace control, the ability to add background audio, filter audio patterns, filter user added background, and add or remove special effects.

Examples of audio source use options include left or right only, mute, left plus right, second display left, second display right, second display left plus right, mix two displays of audio (left plus second display left, left plus second display right, right plus second display left, right plus second display right), narration one or two (from microphone or music input), and selected music source.

Examples of audio mix timing options include straight mixing, delay source for either mixing option, multiplexing for any number of seconds between the two mixes, swapping between mixes, or audio pace swapping. Audio volume choices include adjusting volume for any source use, and for either channel.

Examples of audio pace control options (e.g., fast forward and fast reverse) include playing two programs at two times normal speed for pacing of two programs viewed simultaneously; setting the system to initiate or stop fast forward or fast reverse if an audio threshold of no audio is met or not met; and selecting or stopping fast forward or fast reverse if a filter audio pattern is met.

Examples of options for adding background audio include adding keys to initiate addition of audio background, adding background audio to sections where the threshold of audio is met or not met, and adding background audio to record music selection or narration selection or both.

Examples of options for filtering audio patterns include filtering crowd noise, reducing amplitude if above a threshold, and any audio clip compare option. The approach to these, as with other audio data compare functions, would be to match within a margin a current pattern to an expected pattern, where the expected pattern can be pre-programmed from even a previously captured pattern. Examples of other filter options include adding background audio, such as adding a pre-recorded background selected by the user (such as narration or music filtered with a pre-recorded key), changing the amplitude of the added background audio relative to other audio, and filtering recorded header profiling audio (e.g., defining narration or music).

Examples of special effects options include accelerating audio if playback is at the normal rate (e.g., buffer a few seconds then play back at fast forward to the next reasonable gap), or slowing audio if playback is at the normal rate (e.g., buffer a few seconds then use low audio level or drop words to keep pace).

Examples of mute options include instances where there is a significant audio amplitude difference between source use with multi-channel. The selected source channel may be muted (e.g., if the softer audio is desired, the less soft one will be muted, or if the less soft one is desired, the softer audio may be muted). Other examples include muting if the audio is below a programmed threshold, or muting or not muting if a selected filter audio pattern is met within a margin at programmable selected points (e.g., start or stop immediately if there is a match, if there is no match, or start or stop a selected number of seconds before match or after match, or both, or start or stop a selected number of seconds before there is a match, after there is a match, or both).

Examples of channel change options include going to the next channel or the next channel on a user list based on a compare condition being met; and channel change on threshold audio delta margin match, or no match, or on selected filter audio pattern being met.

Examples of system options include listening to audio on one speaker several seconds in advance of other speakers, including the option to mute in advance of the play of the video and the video's concurrent audio. Or, a user may fast reverse several seconds back to mute audio with an optional record of the mute, such as for censoring future playback. The normal playback is then programmed to mute at the proper time.

Examples of display presentation type sets are using audio volume to select which video to display as full screen, which part of screen to employ, or which video to make smaller. Also, an audio clip match within a certain delta may be employed to select which video to display in a full screen, and which channel if a search is available, on which part of the screen, or which video to make smaller. Another example would be to command the system to repeat the functions that were executed the same night the previous week, or that were executed the last time a particular program or programs was/ were played.

An example of a video display selection set would be to start or stop fast forward or fast reverse according to a video data threshold match, such as a blank screen or studio symbol to fast forward through movie previews.

System program selection sets include programming and sequencing of each speaker, display presentation, video one, and video two. Timing can be added to each selection set such that other options can be multiplexed in at a given programmed time. For example, during a play of a recorded concert, all musical parts may be broadcast on all speakers during certain sections, separated on different speakers during another part of the same play, and at a different time parts played on one speaker may be switched to another.

Other examples of program selection sets include pre-programmed view choices, existing or program current video programs (e.g., a TV program or movie), or leveraging another video program's settings to do playback. A full program is recorded and points to proper start and stop points. The current view can be full or any level of interactive or stored filtering program. Other examples of options would be to view with alternative audio, view with designated speakers and display program, override existing programming at any point, employ base audio filtering (e.g., monitor closed captioning for list of words that are not to go to audio), or employ layered filtering with any combination of the above.

There are also interactive option selection sets. Examples include mute at select points, mute for several seconds, mute for several seconds and fast rewind to mute point to edit muted clip or a part of muted clip, any combination of mute options; audio from a channel located via a clip compare match may be queued and a prompt provided to listen or not; and any speaker, display, or video function can be coupled to any other.

Examples of indexing options include the ability to compare existing recorded program content to identify duplications and eliminate copies. Indexing may be based on various criteria including priority preference, date recorded, date last viewed, and day of week.

Examples of audio key implementation include the ability to identify that audio overlay has occurred, selectively remove the overlay audio or original source from the overlaid audio, selectively remove multiple overlays or the original source from the overlaid audio, and use the overlay function to execute an overall amplitude increase or decrease.

Examples of clip compare features include the ability to record audio data captured to the current clip buffer and use it for playback breakpoints, and the ability to capture, record, and index both audio and video data. The data that goes into a recorded audio or video clip for use in later compare functions, and the size of such a clip, is typically chosen by: user selection; fixed time points; a fixed time before or after a current clip; the number of matches in a play preview (e.g., if greater than one, a few seconds before or after a match to allow time for the user to make a proper selection); or from a recorded stream.

One example of an application of the present invention would be to have two programs running at the same time at full screen, with the option to have audio play at a fast forwarded pace, or to always listen to only one audio. In this example it is possible to view video one at full screen while playing for a number of seconds at two times fast forward, then switch to video two and play for a number of seconds at two times fast forward. The audio pace corresponding to each video would likewise be fast forwarded. That way two programs broadcast or played simultaneously, viewed and heard at faster than normal speed, would be seen in full. Applying the present invention's clip compare function to this scenario, the system could be set to change from video one to video two if a certain film studio logo, recorded in a video clip, is located, and to switch back to video one after a set time period has expired.

Another example of an application of the present invention would be to cycle search channels for a match with a certain video or audio clip, and create an index if a match is found. Viewing would be optional. With searches of recorded programs, the searches can be speeded up by performing them in fast forward, while searches of live programs are performed at live program pace. If a match occurs in such a search, the system may report the location of the matching program and resume the search. Once all available programs have been searched, the results and conclusion of the search may be reported. The user may also select from index jump destination (or sequence of jumps).

A detailed example of viewing a television situation comedy without the laugh track would be to create an expected audio clip with a base laugh track; set the threshold for tolerable match delta and length of match; select mute, narration, or background music at match; and start search and compare. If searching live programs, the program may be played at regular pace upon match. If searching recorded programs, play upon match may occur at a fast forwarded pace. Or, an index of like programs may be created, and a prompt may be given to add to an index, complete an index, and/or play the program. Another example of an application of this function would be removal of crowd noise from the play of a sporting event.

A detailed example of parental filtering of undesirable programming would be for the parent to listen to the program via a speaker playing several seconds in advance of the video play, while other speakers broadcast audio in time with the video play. The parent may record mute, narration, or background music overlay with the option to blank or re-use frames prior to censor time, or with the option to repeat until sensor time is completed. The censoring information may be stored. This function may also be employed where the video word expression is opaque (or an icon may be added on the censored section of the frame) at censor time.

An example of overlay of audio would be to overlay soft background music where audio scenes are low, and in the same program all high amplitude audio scenes would decimate audio and overlay the soft background music. This function would occur by creating an expected audio clip with low audio and high audio values, such as by setting a tolerance threshold for match delta and length of match; selecting background music and volume that can be on low audio match and high audio match; starting search and compare; overlaying recorded background music if there is a low audio match; and adjusting the amplitude on source audio to decimate audio and overlay background music if there is a match on high audio.

An example of audio indexing would be to store an audio clip from viewing and search for fragments and full match from either recorded or live programs. The routine would be to program the expected audio clip; set the threshold for tolerable match delta and length of match; start search and compare; if match, index results; program audio with next fragment of audio clip; start search and compare; if match, index results; if not complete, just back a set number of play increments (such as seconds or frames); if all fragments have been searched; prompt user to view index of locations of matches. An application of this routine would be to view episodes of a particular television program, excluding commercials based on audio match of base music that starts a scene. The routine would be to program an expected audio clip, such as by previously recording to a clip the music played at the opening of each scene of the chosen television program; set the threshold for tolerable match delta and length of match; start search and compare; if live, may have option to play recorded video or second video display, during wait for program to start; if recorded, build an index upon finding a match, and continue building index with matches until complete; then prompt user to index data. The option to view the index sequenced points is available.

Thus, the settop box system 200 is designed to give makers of middleware a means of providing alternative viewing options, and give users the ability to create new programs to share with others. Users are provided with a means of tailoring their viewing experience to their personal needs. The program is implemented as value added hardware and software, which leverages existing device drivers and middleware. It provides audio and video editing and programming capabilities that have never before been available to private consumers via a settop box for home entertainment systems.

While the present invention has been illustrated and described in terms of particular apparatus and methods of use, it is apparent that equivalent parts may be substituted for those shown and other changes can be made within the scope of the present invention as defined by the appended claims.

The particular embodiments disclosed herein are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

I claim:

1. A settop box for controlling an audio-video system comprising:
   a CPU;
   a digital video processor coupled to said CPU for processing video data, said digital video processor having a first input receiving live video data, a second input receiving recorded video data, a first multiplexer configured to select between said live video data and said recorded video data, a current clip buffer module storing a current video clip from said live video data, an expected clip buffer module storing an expected video clip from the live video data or recorded video data selected by said first multiplexer, and a compare module coupled to the current clip buffer module and the expected clip buffer module, wherein the compare module determines whether said current video clip sufficiently matches said expected video clip based upon a first threshold value; and a digital audio processor coupled to said CPU for processing audio data;

wherein, in a first mode, one or more control functions are initiated when the current video clip data sufficiently matches the expected video clip data to record said live video data.

2. The settop box of claim 1, wherein said digital audio processor is capable of comparing current audio clip data to expected audio clip data and, in a second mode, said one or more control functions are initiated when the current audio clip data sufficiently matches the expected audio clip data.

3. The settop box of claim 1 further comprising a recording module coupled to said CPU having storage media for storing said recorded audio data, storing said recorded video data and recording said live video data in said first mode.

4. The settop box of claim 1 further comprising a menu module coupled to said CPU for providing a menu driven interface to the settop box.

5. The settop box of claim 1, further comprising an MSE module for determining a mean square error between the current video clip data and the expected video clip data, wherein the mean square error is used by the compare module to determine if there is a sufficient match.

6. The settop box of claim 1, wherein the compare module compares the first threshold value with the mean square error between the current video clip data and the expected video clip data to determine if there is a sufficient match.

7. The settop box of claim 1, wherein said digital video processor further comprises a status register which indicates whether a sufficient match has been determined between the current video clip and the expected video clip.

8. The settop box of claim 7, wherein at least one of said one or more control functions is initiated when the status register indicates a sufficient match.

9. The settop box of claim 1, wherein the current video clip and the expected video clip are about the same size.

10. The settop box of claim 1, wherein said digital video processor further comprises a control register specifying parameters of the comparison between the current video clip and the expected video clip.

11. The settop box of claim 10 wherein said parameters in said control register include a size of the current and the expected video clips to be compared.

12. The settop box of claim 10 wherein said parameters in said control register include said first threshold value used to determine sufficient similarity between the current and the expected video clips.

13. An audio-video system comprising:

a settop box capable of receiving audio-video data from a live feed;

a digital video processor coupled to said settop box for processing video data; and a digital audio processor coupled to said settop box for processing audio data, said digital audio processor comprising (i) a first multiplexer configured to select between one or more live audio feeds, one or more recorded audio feeds and a blend of two or more of the live audio feeds and the recorded audio feeds, (ii) an attenuation module configured to receive one or more outputs of the first multiplexer, (iii) a second multiplexer configured to select between one or more outputs of the attenuation module and the one or more outputs of the first multiplexer, (iv) an overlay module receiving the one or more outputs of the attenuation module and generating one or more audio overlay outputs, (v) a third multiplexer configured to select between the one or more audio overlay outputs and the one or more outputs of the first multiplexer, (vi) a fourth multiplexer configured to select between the one or more recorded audio feeds and an output of the third multiplexer, (vii) a current audio clip buffer module coupled to the output of the third multiplexer and storing a current audio clip, (viii) an expected audio clip buffer module coupled to an output of the fourth multiplexer and storing an expected audio clip, and (ix) a compare module coupled to the current audio clip buffer module and the expected audio clip buffer module, wherein the compare module determines whether the current audio clip data sufficiently matches the expected audio clip data based upon a first threshold value;

wherein, in a first mode, one or more control functions are initiated when the current audio clip data sufficiently matches the expected audio clip data to record said live video data.

14. The system of claim 13 further comprising at least one audio speaker coupled to said settop box.

15. The system of claim 13 further comprising at least one video display coupled to said settop box.

16. The system of claim 13, wherein said digital video processor is capable of comparing current video clip data to expected video clip data and, in a second mode, said one or more control functions are initiated when the current audio clip data sufficiently matches the expected audio clip data.

17. The system of claim 13 further comprising a recording module coupled to said settop box having storage media for storing recorded audio or video data.

18. The system of claim 13 further comprising a menu module coupled to said settop box for providing a menu driven interface to the system.

19. The system of claim 13 further comprising an audio MSE module for determining a mean square error between the current audio clip data and the expected audio clip data, wherein the mean square error is used by the audio compare module to determine if there is a sufficient match.

20. The system of claim 13, wherein the audio compare module compares the first threshold value with the mean square error between the current audio clip data and the expected audio clip data to determine if there is a sufficient match.

21. The system of claim 14, wherein said digital audio processor further comprises an audio status register which indicates whether a sufficient match has been determined between the current audio clip and the expected audio clip.

22. The system of claim 21, wherein a control function is initiated when the audio status register indicates a sufficient match.

23. The system of claim 13, wherein the current audio clip and the expected audio clip are about the same size.

24. The system of claim 13, wherein said digital audio processor further comprises an audio control register specifying parameters of the comparison between the current audio clip data and the expected audio clip data.

25. The system of claim 24, wherein said parameters in said audio control register include a size of the current and the expected audio clips to be compared.

26. The system of claim 24, wherein said parameters in said audio control register include the first threshold value used to determine sufficient similarity between the current and the expected audio clips.

27. The system of claim 13, wherein said attenuation module controls an amplitude of one or more audio signals.

28. The system of claim 13, wherein said overlay module overlays audio data from a first source in place of audio data from a second source.

29. The system of claim 13, wherein said digital audio processor further comprises a filtering module coupled between said attenuation module and said third multiplexer for filtering out predetermined audio signals.

30. A method of controlling audio or video programming via a settop box comprising:

receiving instructions from a user in response to a menu Presented by said settop box;

recording an expected audio or video clip on a storage medium in response to a first instruction from said user;

receiving one or more live audio or video feeds;

storing said expected audio or video clip in a expected clip buffer module of said settop box in response to a second instruction from said user;

storing a current audio or video clip from said one or more live audio or video feeds in a current clip buffer module of said settop box in response to said second instruction from said user;

comparing the current audio or video clip to the expected audio or video clip; and initiating one or more control functions of said settop box when said current audio or video clip sufficiently matches said expected audio or video clip.

31. The method of claim 30 wherein said one or more control functions comprises audio or video recording.

32. The method of claim 30 wherein said one or more control functions comprises control of audio or video playback.

33. The method of claim 30 wherein said one or more control functions comprises channel changing.

34. The method of claim 30 wherein said one or more control functions comprises audio mixing.

35. The method of claim 30 wherein said one or more control functions comprises audio filtering.

36. The method of claim 30 wherein said one or more control functions comprises audio or video overlay.

37. The method of claim 30 wherein said one or more control functions comprises audio attenuation.

38. The method of claim 30 wherein said one or more control functions comprises audio or video pace control.

39. The method of claim 30 wherein said one or more control functions comprises audio or video indexing.

40. The settop box of claim 1, wherein said digital audio processor comprises (i) a second multiplexer configured to select between one or more live audio feeds, one or more recorded audio feeds and a blend of two or more of the live audio feeds and the recorded audio feeds, (ii) an attenuation module configured to receive one or more outputs of the first multiplexer, (iii) a third multiplexer configured to select between one or more outputs of the attenuation module and the one or more outputs of the second multiplexer, (iv) an overlay module receiving the one or more outputs of the attenuation module and generating one or more audio overlay outputs, (v) a fourth multiplexer configured to select between the one or more audio overlay outputs and the one or more outputs of the second multiplexer, (vi) a fifth multiplexer configured to select between the one or more recorded audio feeds and an output of the fourth multiplexer, (vii) a current audio clip buffer module coupled to the output of the fourth multiplexer and storing a current audio clip, (viii) an expected audio clip buffer module coupled to an output of the fifth multiplexer and storing an expected audio clip, and (ix) a compare module coupled to the current audio clip buffer module and the expected audio clip buffer module, wherein the compare module determines whether the current audio clip data sufficiently matches the expected audio clip data based upon a second threshold value.

41. The audio-video system of claim 13, wherein said digital video processor comprises a first input receiving live video data, a second input receiving recorded video data, a fifth multiplexer configured to select between said live video data and said recorded video data, a current video clip buffer module storing a current video clip from said live video data, an expected video clip buffer module storing an expected video clip from the video data selected by said fifth multiplexer, and a compare module coupled to the current video clip buffer module and the expected video clip buffer module, wherein the compare module determines whether said current video clip sufficiently matches said expected video clip based upon a second threshold value.

* * * * *